US008019640B2

(12) United States Patent
Barel et al.

(10) Patent No.: US 8,019,640 B2
(45) Date of Patent: Sep. 13, 2011

(54) METHOD, APPARATUS, AND PROGRAM FOR IMPLEMENTING AN AUTOMATION COMPUTING EVALUATION SCALE TO GENERATE RECOMMENDATIONS

(75) Inventors: Miles A. Barel, Danbury, CT (US); Sandra Carter, Austin, TX (US); John P. Crosskey, Danbury, CT (US); Leslie Mark Ernest, Knoxville, MD (US); David Howard Evans, Lexington, KY (US); Lori Lynn Ford, Georgetown, TX (US); Ronald C. Lilies, Round Rock, TX (US); Dwight Spence, Austin, TX (US); Albert L. Swett, Rochester, NY (US)

(73) Assignee: International Business Machines Corporation, Armonk, NY (US)

( * ) Notice: Subject to any disclaimer, the term of this patent is extended or adjusted under 35 U.S.C. 154(b) by 117 days.

(21) Appl. No.: 12/131,611

(22) Filed: Jun. 2, 2008

(65) Prior Publication Data
US 2008/0235079 A1 Sep. 25, 2008

Related U.S. Application Data

(63) Continuation of application No. 10/900,959, filed on Jul. 28, 2004, now abandoned.

(51) Int. Cl.
*G06F 9/44* (2006.01)
(52) U.S. Cl. ....... 705/7.32; 709/221; 709/223; 709/224; 709/226; 709/204; 717/127
(58) Field of Classification Search .............. 705/10
See application file for complete search history.

(56) References Cited

U.S. PATENT DOCUMENTS

| | | | |
|---|---|---|---|
| 5,546,502 A | 8/1996 | Hart et al. | |
| 6,343,275 B1 * | 1/2002 | Wong | 705/26 |
| 6,363,384 B1 | 3/2002 | Cookmeyer, II et al. | |
| 6,633,861 B2 | 10/2003 | Hart et al. | |
| 6,662,355 B1 * | 12/2003 | Caswell et al. | 717/103 |
| 6,856,942 B2 * | 2/2005 | Garnett et al. | 702/183 |
| 7,200,657 B2 * | 4/2007 | Adams et al. | 709/224 |

(Continued)

FOREIGN PATENT DOCUMENTS

EP 1411455 A1 4/2004

OTHER PUBLICATIONS

Roy Sterritt (2002). Towards Autonomic Computing: Effective Event Management. In Proceedings of the 27th Annual NASA Goddard Software Engineering Workshop (SEW-27'02) (SEW '02). IEEE Computer Society, Washington, DC, USA, 40-47.*

(Continued)

*Primary Examiner* — Romain Jeanty
*Assistant Examiner* — Brett Feeney
(74) *Attorney, Agent, or Firm* — Yee & Associates, P.C.; Justin M. Dillon

(57) ABSTRACT

An automation assessment tool is provided that defines autonomic technology, processes, organization, and skill sets that apply to autonomic computing. The automation assessment tool provides educational material about autonomic computing and a scale of maturity levels, which is used to assess on-demand preparedness. The automation assessment tool presents a survey and collects answers to the survey questions. The automation assessment tool then determines solutions and recommendations to achieve a target level of on-demand preparedness.

15 Claims, 13 Drawing Sheets

U.S. PATENT DOCUMENTS

| | | |
|---|---|---|
| 7,216,169 B2 * | 5/2007 | Clinton et al. ............... 709/224 |
| 7,370,098 B2 * | 5/2008 | Doyle et al. ................. 709/223 |
| 7,379,923 B2 * | 5/2008 | Burchfield et al. ........... 705/400 |
| 7,487,494 B2 * | 2/2009 | Chan et al. .................... 717/127 |
| 2002/0133584 A1 * | 9/2002 | Greuel et al. ................ 709/224 |
| 2002/0138571 A1 * | 9/2002 | Trinon et al. ................. 709/204 |
| 2002/0184065 A1 * | 12/2002 | Menard et al. .................... 705/7 |
| 2003/0065543 A1 * | 4/2003 | Anderson ......................... 705/7 |
| 2003/0191877 A1 * | 10/2003 | Zaudtke et al. ................ 710/72 |
| 2003/0212583 A1 * | 11/2003 | Perras et al. ..................... 705/7 |
| 2003/0221002 A1 * | 11/2003 | Srivastava et al. ........... 709/224 |
| 2004/0059704 A1 * | 3/2004 | Hellerstein et al. ............... 707/1 |
| 2004/0059966 A1 | 3/2004 | Chan et al. |
| 2004/0193476 A1 * | 9/2004 | Aerdts ........................... 705/10 |
| 2004/0199417 A1 * | 10/2004 | Baxter et al. ................... 705/10 |
| 2005/0044209 A1 * | 2/2005 | Doyle et al. ................. 709/224 |
| 2005/0132052 A1 * | 6/2005 | Uttamchandani et al. .... 709/226 |
| 2006/0026054 A1 * | 2/2006 | Barel et al. ...................... 705/10 |
| 2006/0026112 A1 * | 2/2006 | Naphade et al. ................ 706/46 |
| 2008/0033745 A1 * | 2/2008 | Burchfield et al. ............... 705/1 |

OTHER PUBLICATIONS

Chen et al., "Risk Probability Estimating Based on Clustering", IEEE Systems, Man and Cybernetics Society Information Assurance Workshop (IEEE Cat. No. 03EX676), pp. 229-233, Published: Piscataway, NJ, USA, 2003, 307 pp.

* cited by examiner

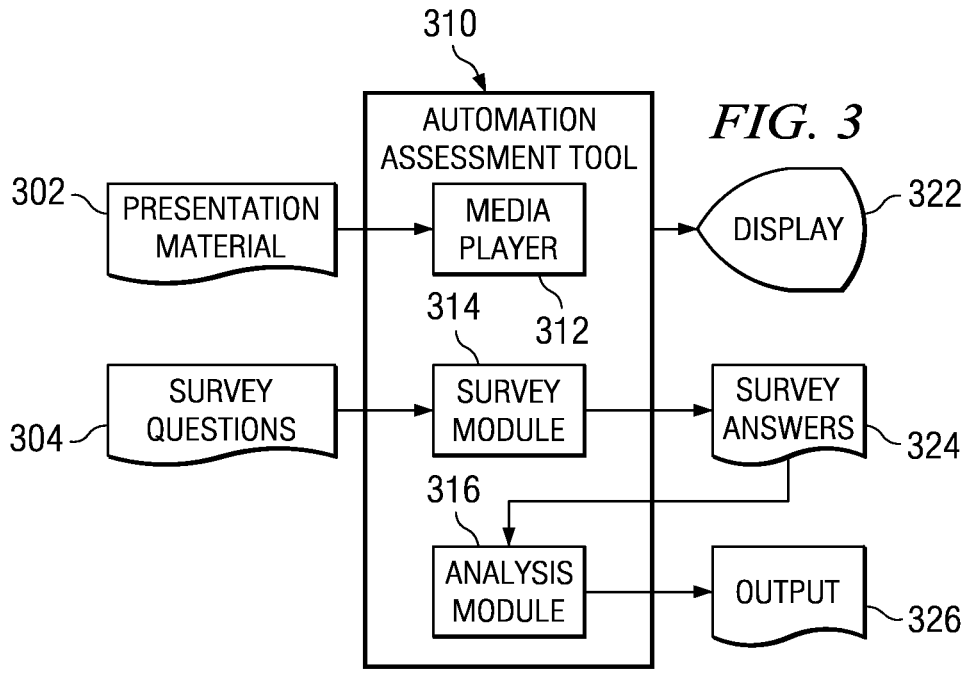
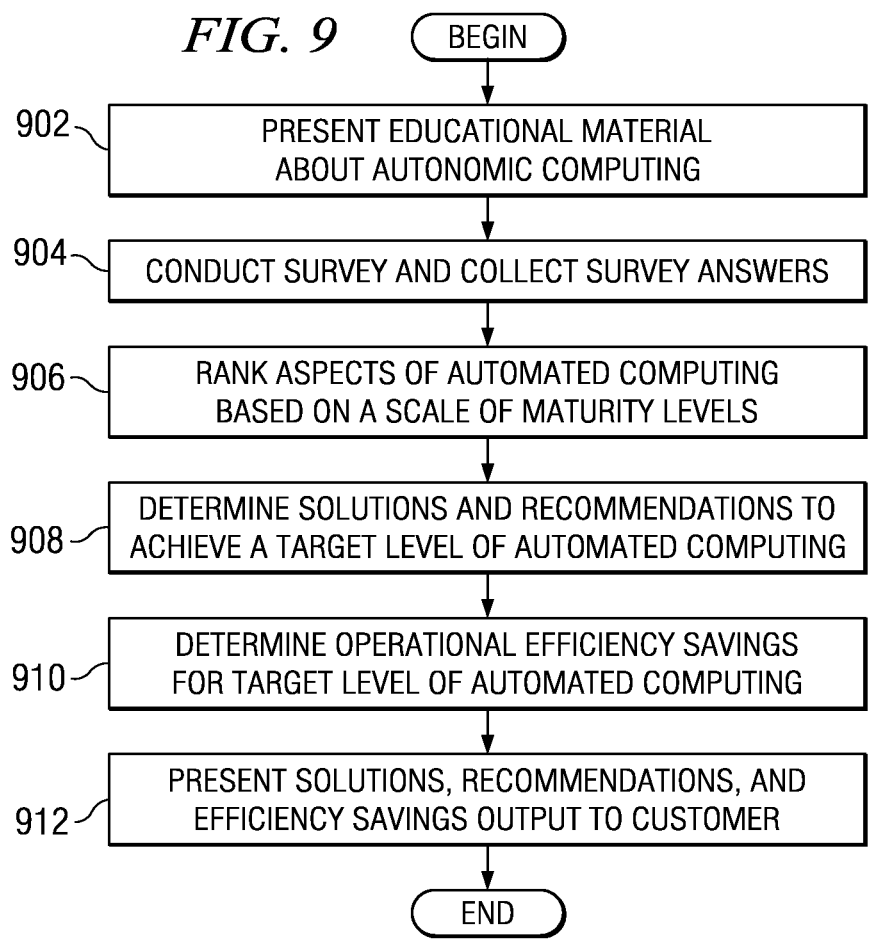

METHOD, APPARATUS, AND PROGRAM FOR IMPLEMENTING AN AUTOMATION COMPUTING EVALUATION SCALE TO GENERATE RECOMMENDATIONS

This application is a continuation of application Ser. No. 10/900,959, filed Jul. 28, 2004, status pending.

BACKGROUND OF THE INVENTION

1. Technical Field

The present invention relates to data processing and, in particular, to autonomic computing. Still more particularly, the present invention provides a method, apparatus, and program product for implementing an automation computing evaluation scale to generate recommendations.

2. Description of Related Art

An on-demand business is an enterprise whose business processes, when integrated end-to-end across the company with key partners, suppliers, and customers, can respond with speed to any customer, market opportunity, or external threat. When an enterprise endeavors to be on-demand ready, it is a goal to increase its sophistication of automation by embedding autonomic capabilities and technologies. An enterprise's autonomic capability may range from basic, where analysis and problem solving are performed manually, to autonomic, where computer systems and networks may configure themselves to changing conditions, for example, and are self-healing in the event of failure with minimal human intervention.

Autonomic computing can help to overcome the barrier of infrastructure complexity. The core benefits of autonomic computing are improved resiliency, ability to deploy new capabilities more rapidly and increased return from IT investments. In a rapidly changing market, the ability to react quickly is a competitive advantage. Bottom line, advanced automation through utilizing autonomic technology allows companies to focus on business, not on infrastructure. Therefore, it may be a goal of an on-demand business to improve its levels of automation by incorporating autonomic computing technologies.

It is also a goal of a company providing automated computing technology and services to assess the autonomic computing capabilities of customers. There are white papers on autonomic computing problem determination and definitions for what an autonomic computing system does. However, there are no clear benchmarks that enable such an assessment and no tools exist for determining recommendations that may allow customers to become more automation computing capable.

SUMMARY OF THE INVENTION

The present invention recognizes the disadvantages of the prior art and provides an automation assessment tool that defines autonomic technology, processes, organization, and skill sets that apply to autonomic computing. The automation assessment tool provides educational material about autonomic computing and a scale of maturity levels, which is used to assess on-demand preparedness. The automation assessment tool presents a survey and collects answers to the survey questions. The automation assessment tool then determines solutions and recommendations to achieve a target level of on-demand preparedness.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 is a block diagram illustrating an automation assessment tool in accordance with an exemplary embodiment of the present invention;

FIG. 9 is a flowchart illustrating the operation of an automation assessment tool in accordance with an exemplary embodiment of the present invention.

DETAILED DESCRIPTION OF THE PREFERRED EMBODIMENT

Figure 1:
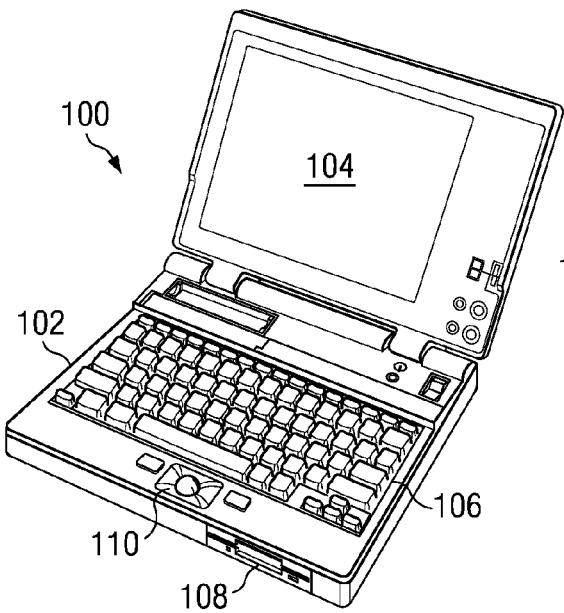
FIG. 1 is a pictorial representation of a data processing system in which exemplary aspects of the present invention may be implemented.
Figure 2:
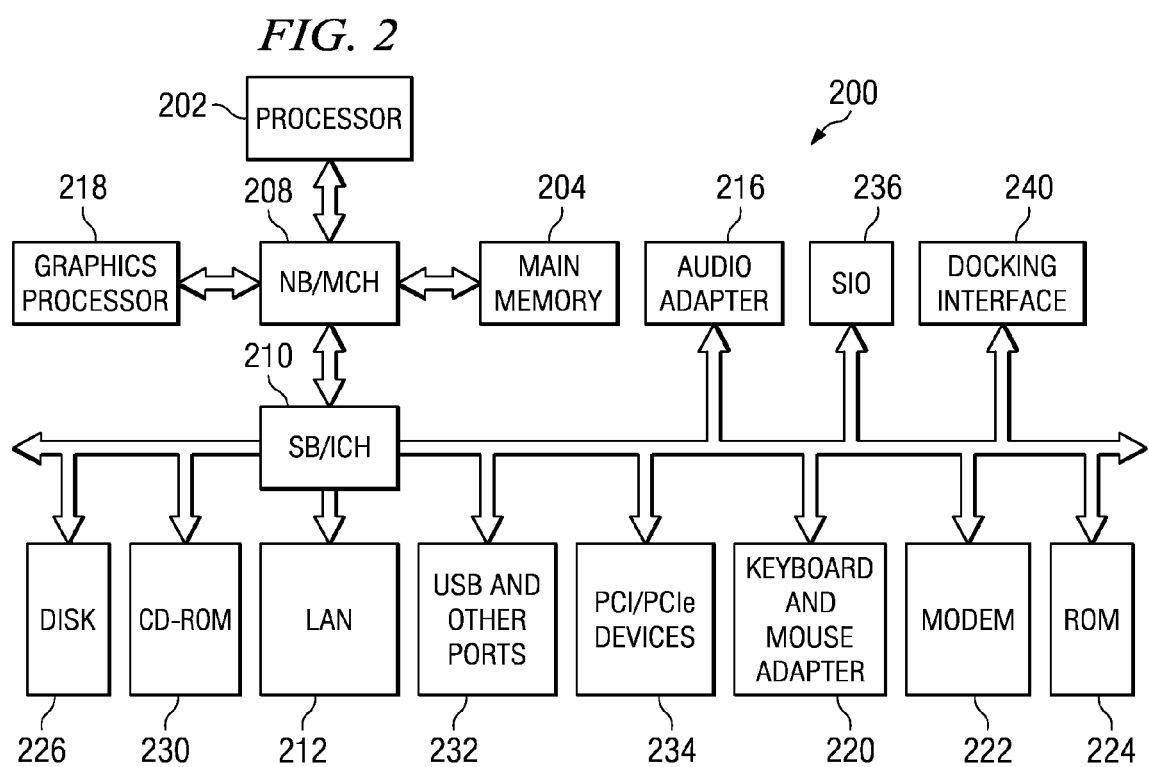
FIG. 2 is a block diagram of a data processing system in which exemplary embodiments of the present invention may be implemented.

The present invention provides a method, apparatus and computer program product for implementing an automation computing evaluation scale to generate recommendations. The data processing device may be a stand-alone computing device or may be a distributed data processing system in which multiple computing devices are utilized to perform various aspects of the present invention. Therefore, the following FIGS. 1 and 2 are provided as exemplary diagrams of data processing environments in which exemplary aspects of the present invention may be implemented. It should be appreciated that FIGS. 1 and 2 are only exemplary and are not intended to assert or imply any limitation with regard to the environments in which the present invention may be implemented. Many modifications to the depicted environments may be made without departing from the spirit and scope of the present invention.

With reference now to the figures and in particular with reference to FIG. 1, a pictorial representation of a data processing system in which exemplary aspects of the present invention may be implemented is depicted. A mobile computer 100 is depicted which includes system unit 102, video display terminal 104, keyboard 106, storage devices 108, which may include floppy drives and other types of permanent and removable storage media, and pointer device 110. Additional input devices may be included with mobile computer 100, such as, for example, a mouse, joystick, touch screen, trackball, microphone, and the like. Mobile computer 100 man be implemented using any suitable computer, such as an IBM ThinkPad® computer, which is a product of International Business Machines Corporation, located in Armonk, N.Y. Computer 100 also preferably includes a graphical user interface (GUI) that may be implemented by means of systems software residing in computer readable media in operation within computer 100.

With reference now to FIG. 2, a block diagram of a data processing system is shown in which exemplary embodiments of the present invention may be implemented. Data processing system 200 is an example of a mobile computer, such as computer 100 in FIG. 1, in which code or instructions implementing the processes of the present invention may be located. In the depicted example, data processing system 200 employs a hub architecture including a north bridge and memory controller hub (MCH) 208 and a south bridge and input/output (I/O) controller hub (ICH) 210. Processor 202, main memory 204, and graphics processor 218 are connected to MCH 208. Graphics processor 218 may be connected to the MCH through an accelerated graphics port (AGP), for example.

In the depicted example, local area network (LAN) adapter 212, audio adapter 216, keyboard and mouse adapter 220, modem 222, read only memory (ROM) 224, hard disk drive (HDD) 226, CD-ROM driver 230, universal serial bus (USB) ports and other communications ports 232, and PCI/PCIe devices 234 may be connected to ICH 210. PCI/PCIe devices may include, for example, Ethernet adapters, add-in cards, PC cards for notebook computers, etc. PCI uses a cardbus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be connected to ICH 210.

Docking interface 240 may also be connected to the ICH. Data processing system 200 may be a mobile computing device, such as a laptop computer or handheld computer. Docking interface 240 provides port replication to allow the data processing system to easily connect to a keyboard, pointing device, monitor, printer, speakers, etc. The docking interface allows the mobile computing device to operate as a desktop computer with the more immobile peripheral devices.

An operating system runs on processor 202 and is used to coordinate and provide control of various components within data processing system 200 in FIG. 2. The operating system may be a commercially available operating system such as Windows XP™, which is available from Microsoft Corporation. An object oriented programming system, such as the Java™ programming system, may run in conjunction with the operating system and provides calls to the operating system from Java programs or applications executing on data processing system 200. "JAVA" is a trademark of Sun Microsystems, Inc. Instructions for the operating system, the object-oriented programming system, and applications or programs are located on storage devices, such as hard disk drive 226, and may be loaded into main memory 204 for execution by processor 202. The processes of the present invention are performed by processor 202 using computer implemented instructions, which may be located in a memory such as, for example, main memory 204, memory 224, or in one or more peripheral devices 226 and 230.

Those of ordinary skill in the art will appreciate that the hardware in FIG. 2 may vary depending on the implementation. Other internal hardware or peripheral devices, such as flash memory, equivalent non-volatile memory, or optical disk drives and the like, may be used in addition to or in place of the hardware depicted in FIG. 2. Also, the processes of the present invention may be applied to a multiprocessor data processing system.

For example, data processing system 200 may be a personal digital assistant (PDA), which is configured with flash memory to provide non-volatile memory for storing operating system files and/or user-generated data. The depicted example in FIG. 2 and above-described examples are not meant to imply architectural limitations. For example, data processing system 200 also may be a tablet computer or telephone device in addition to taking the form of a PDA.

In accordance with exemplary embodiments of the present invention, an automation assessment tool is provided to assess a client's current information technology (IT) environment to determine on-demand readiness. The automation assessment tool defines autonomic technology, processes, organization, and skill sets that apply to autonomic computing. The automation assessment tool provides educational material about autonomic computing and a scale used to measure on-demand preparedness. The automation assessment tool presents a survey and collects answers to the survey questions. The automation assessment tool then determines solutions and recommendations to achieve a target level of on-demand preparedness.

FIG. 3 is a block diagram illustrating an automation assessment tool in accordance with an exemplary embodiment of the present invention. Automation assessment tool 310 includes media player 312, survey module 314, and analysis module 316. Media player 312 presents educational presentation material 302 to a customer via an output device, such as display 322.

Presentation material 302 may provide information about automation including information about automation fundamentals, autonomic self-managing capabilities, automation maturity levels, and automation assessment categories. The information provided in presentation material 302 serves to educate the customer generally about automation and, more specifically, about the manner in which automation will be assessed by automation assessment tool 310. Media player 312 may be, for example, a web browser, video player, or presentation graphics application program. In one exemplary embodiment, media player 312 may be a Flash® player from Macromedia, Inc.

Survey module 314 presents survey questions 304 to an operator and receives answers to the questions. A sales representative of a company that provides automated computing technology and services may conduct the survey and enter answers provided by a customer. Survey module 314 stores survey answers 324 for subsequent inspection and for use by analysis module 316.

To illustrate the operation of survey module 314, an example assessment survey for availability management may include the following questions:
How would you characterize your current availability processes?
How have you leveraged technology to enable your availability management process?
How would you define the availability management skill level of your current staff?

An example assessment survey for performance and capacity management may include the following questions:
How would you characterize your current performance and capacity management processes?
How have you leveraged technology to enable your performance and capacity management processes?
How would you define the performance and capacity plan skill level of your current staff?

An example survey for security management may include the following questions:
- How would you characterize your current security management processes?
- How have you leveraged technology to enable your security management processes?
- How would you define the security management skill level of your current staff?

An example survey for user administration may include the following questions:
- How would you characterize your current user administration processes?
- How have you leveraged technology to enable your user administration process?
- How would you define the user administration skill level of your current staff?

An example assessment survey for solution deployment may include the following questions:
- How would you characterize current solution deployment processes?
- How have you leveraged technology to enable your solution deployment processes?
- How would you define the solution deployment skill level of your current staff?

An example assessment survey for problem management may include the following questions:
- How would you characterize your current problem management processes?
- How have you leveraged technology to enable your problem resolution processes?
- How would you define the problem determination skill level of your current staff?

The example survey questions above are merely exemplary. The questions may be modified depending upon the implementation. For example more or fewer questions may be provided.

Analysis module 316 analyzes the automation capabilities of the customer based on survey answers 324. Automation capabilities of an enterprise include, for example, the ability to be self-configuring, the ability to be self-healing, the ability to be self-optimizing, and the ability to be self-protecting. Across the four automation capabilities, there are several key operational areas where one can assess automation maturity. These operational areas are used as automation assessment categories in accordance with an exemplary embodiment of the present invention. The automation assessment categories may include, for example, problem management, availability management, security management, solution deployment, user administration, and performance and capacity management.

Problem management is the act of identifying, isolating, and resolving issues that might negatively impact IT service delivery. Availability management is the act of ensuring that required IT services are available, as needed, to ensure business continuity. Security management is the act of securing critical business resources and data against attacks and authorized access from both external and internal threats. Solution deployment is the act of planning, testing, distributing, installing, and validating the deployment of new IT solutions, including the IT infrastructure elements, in a manner that is the least disruptive to operational services. The ability to roll back to a prior functioning environment if a change is unsuccessful is also necessary. User administration is the act of managing the full lifecycle of a user's access to the company resources, such as adding, deleting, and changing access to resources based on business policies and job function. Performance and capacity management is the act of monitoring and managing system performance to adequately meet the throughput and response time requirements associated with operational business needs.

Analysis module 316 ranks the various aspects of the customer's on-demand readiness based on a scale of maturity levels. The maturity levels may include, for example, basic, managed, predictive, adaptive, and autonomic. For example, analysis module 316 may rank each of the key operational areas based on this scale. In addition, analysis module 316 may optionally rank technology, processes, and skill sets based on this scale.

The basic maturity level indicates that the customer uses manual analysis and problem solving. In a real-world scenario, transaction response times may slow during key transactions. To diagnose this problem within the basic maturity level, multiple product experts may analyze product-specific events and logs. The basic maturity level requires extensive, highly skilled IT staff. A benefit of this maturity level is that basic requirements are addressed.

The managed maturity level indicates that the customer uses centralized tools and performs manual actions. In a real-world scenario, the IT staff uses tools to look at transaction response data and event data from multiple products to help them make a decision. In the managed maturity level, the IT staff analyzes data and takes actions. Benefits of the managed maturity level include greater system awareness and improved productivity.

The predictive maturity level indicates that the customer monitors, correlates data, and recommends action. In a real-world scenario, transaction trend analysis data (symptoms) is stored in a central database where this data is used to predict events and to recommend actions. Technology-analysis correlates symptoms with recommended actions. The IT staff approves and initiates actions. The predictive maturity level enables reduced dependency on deep IT skills and faster and better decision-making.

The adaptive maturity level indicates that the customer uses system that monitors, correlates data, and takes actions. In a real-world scenario, when a problem occurs with a transaction, a particular symptom is matched to a recommended action, and the system takes the action. The IT staff manages performance against service level agreements. The adaptive maturity level allows balanced human-to-system interaction and increases IT agility and resiliency.

The autonomic maturity level indicates dynamic business policy based management. In a real-world scenario, action is taken based on business policy, for example, giving preference for key transactions over less important ones, or performing an action (like a reboot) during a non-critical time. The IT staff focuses on business needs. Business policy drives IT management. The autonomic maturity level increases business agility and resiliency.

Analysis module 316 determines solutions and recommendations to achieve a target level of automated computing based on survey answers 324. Survey module 314 may provide multiple-choice answers to be selected by the customer. These multiple-choice answers may be associated with specific solutions and recommendations. For example, if the customer indicates in the answers to the survey that the IT staff can use cross-resource availability analyses to predict business system availability and manually make adjustments to maintain business system availability based on business objectives, then automation assessment tool 310 may recommend that the customer schedule education on workflow automation and business integration to enable automation of the best-practices processes that keep IT running.

Analysis module 316 may also determine a financial impact that may result from achieving a target level of automated computing capability or on-demand preparedness. For example, analysis module 316 may generate a graph that compares target IT spending over time compared to IT spending based on current on-demand readiness. Analysis module 316 provides solutions, recommendations, and financial impact information as output 326, which may be stored in persistent storage or presented by an output device, such as display 322.

Automation assessment tool 310 may be an expert system that crawls through corporate databases and may infer information to create analysis output 326. An expert system is an artificial intelligence (AI) application that uses a knowledge base of human expertise or historical information for problem solving. The success of an expert system is based on the quality of the data and rules obtained from a human expert. In practice, expert systems perform both below and above that of a human. Analysis module 316 may use rules (not shown) to derive answers by running information, such as survey answers 324, through an inference engine (not shown), which is software that processes results from rules and data in a knowledge base.

An operator may change answers in survey answers 324 and determine changes in output 326. In this manner, a customer may see how changes in automation capabilities affect the assessment output. Thus, automation assessment tool 310 may provide navigation to higher or lower levels of autonomic computing to generate recommendations.

Figure 4A:
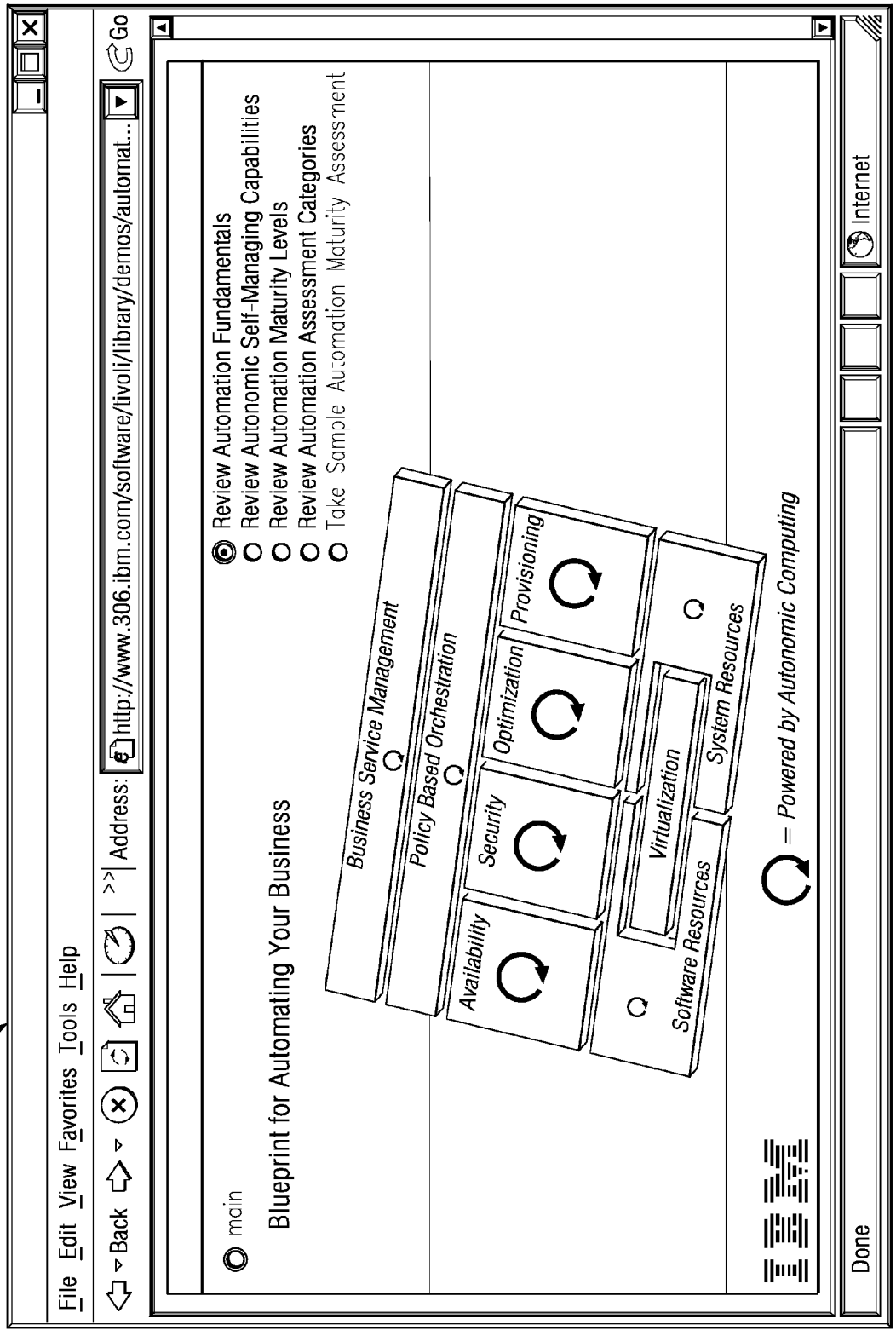
FIGS. 4A-4D illustrate example presentation material presented by an automation assessment tool in accordance with an exemplary embodiment of the present invention.

FIGS. 4A-4D illustrate example presentation material presented by an automation assessment tool in accordance with an exemplary embodiment of the present invention. More particularly, with reference to FIG. 4A, presentation display 400 may provide educational information about automation fundamentals including business service management, policy based orchestration, availability, security, optimization, provisioning, and virtualization.

Business service management is the activity of integrating business-process-to-business-process. Business process integration provides the tools needed to manage service levels, meter system utilization, and bill customers for that usage, as well as model integrate, connect, monitor, and manage business processes from end to end for complete linkage of business applications and linkage of business processes to the IT environment.

Policy based orchestration helps customers automatically control and manage the four capabilities (availability, security, optimization, provisioning) so that the entire IT infrastructure is responding dynamically to changing conditions according to defined business policies. The orchestration builds on industry best practices and the collective IT experience of the customer to ensure that complex deployments are achieved, on demand, with speed and quality.

Availability management ensures the health and functioning of IT environments based on business objectives. Delivery of consistent and reliable service levels with reduced IT administration costs is key, enabled by dynamic event generation, correlation and analysis and automated cure aligned with business views of the IT infrastructure. With respect to availability management, the automation assessment tool emphasizes self-healing.

Security management ensures that policies for identity management, including access and privacy control, are consistently defined and enforced across the IT environment. Security management enables the automated detection of and response to security threats, including intrusions and insecure configurations. With respect to security management, the automation assessment tool emphasizes self-protecting.

Optimization ensures the most productive utilization of IT infrastructure based on business objectives. Capabilities like transaction performance management, dynamic workload management, and dynamic job and task scheduling are key within application domains and across a heterogeneous IT infrastructure. With respect to optimization, the automation assessment tool emphasizes self-optimization.

Provisioning provides the ability to automatically and dynamically configure and deploy resources in response to changing business conditions and objectives in heterogeneous environments. Provisioning can be elemental (that is, server provisioning, storage provisioning, and so forth) and horizontal (that is, end-to-end application provisioning). With respect to provisioning, the automation assessment tool emphasizes self-configuration.

Virtualization enables resources to be shared, managed, and accessed across a workgroup, enterprise, or even across company boundaries, regardless of operating characteristics. Users benefit from seamless and uninterrupted access to resources, while the physical resources that compose a virtualized environment might reside in multiple locations. Resource virtualization provides access to processing power and data to improve asset utilization and efficiency, to rapidly solve complex business problems, to conduct computer-intensive research and data analysis, and to respond to real-time business fluctuations on demand.

Figure 4B:
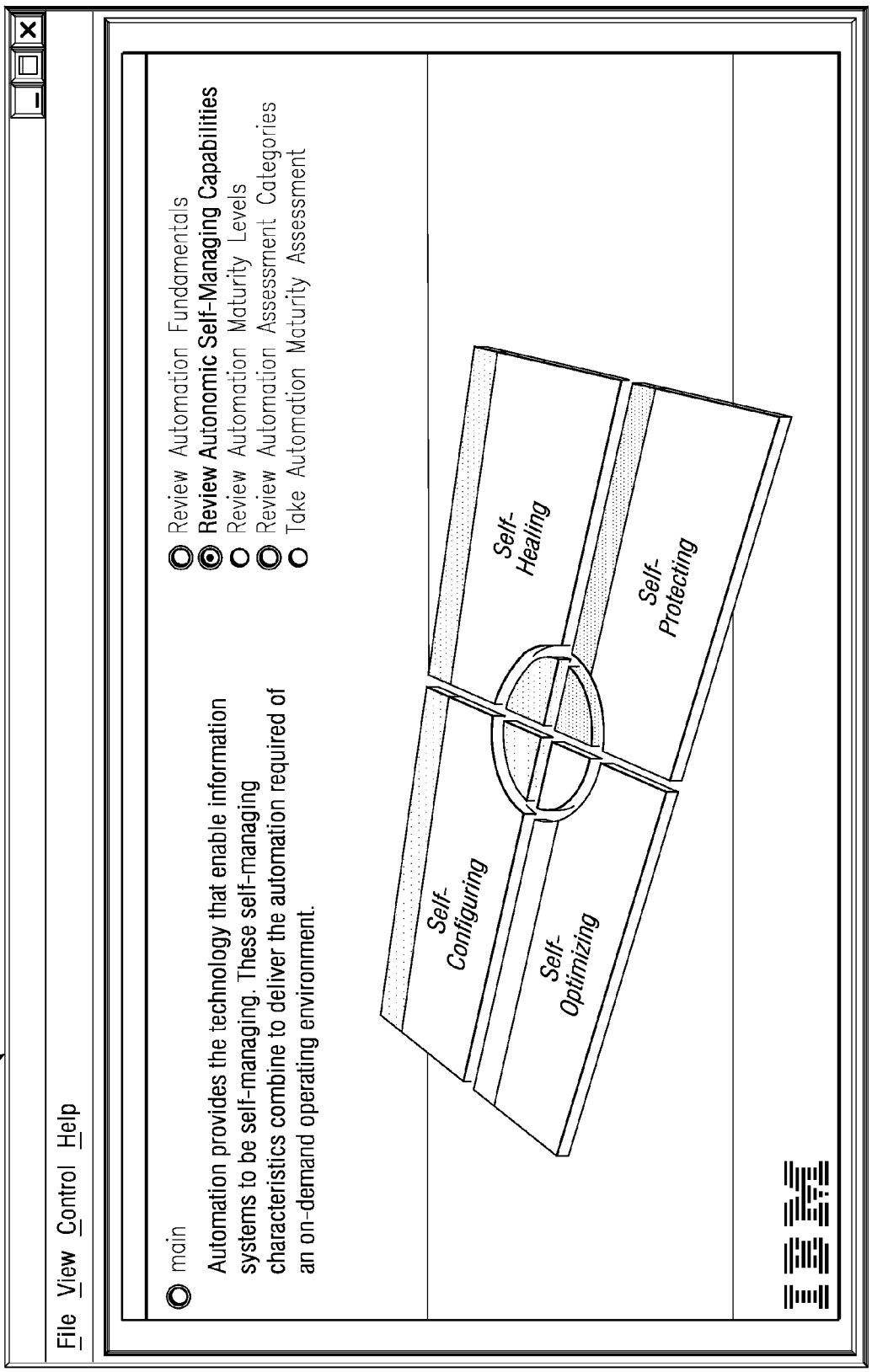

Turning to FIG. 4B, display 410 presents a review of self-managing capabilities in automatic computing. Automation capabilities of an enterprise include, for example, the ability to be self-configuring, the ability to be self-healing, the ability to be self-optimization, and the ability to be self-protecting. A self-configuring environment can dynamically configure itself on-the-fly and can adapt itself to the deployment of new components or changes with minimal human intervention. A self-healing IT environment can detect improper operation of systems, transactions, and business processes, and then initiate corrective action without disrupting users or services. A self-optimizing IT environment addresses the complexity of managing system performance. A self-optimizing environment can learn from experience and can proactively tune itself in the context of an overall business objective. A self-protecting IT environment can allow the right people to access the right data at the right time. A self-protecting environment can automatically take the appropriate actions to make itself less vulnerable to attacks on its runtime infrastructure and on its business data.

Figure 4C:
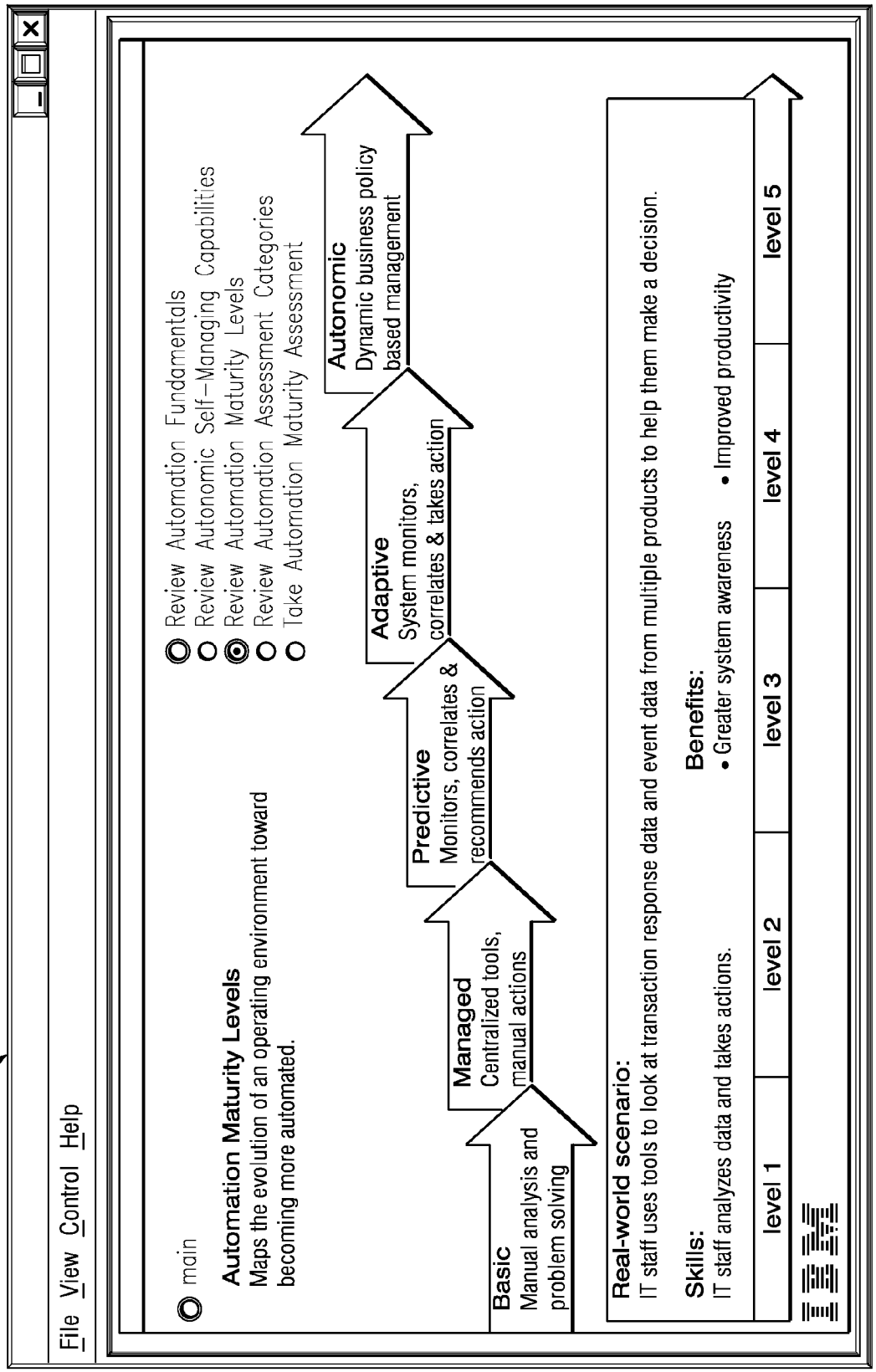

With reference now to FIG. 4C, display 420 presents a review of automation maturity levels in accordance with an exemplary embodiment of the present invention. A user may navigate display 420 to view a description of each of the maturity levels to prepare for the assessment survey and the subsequent results. In the depicted example, the maturity levels include basic, managed, predictive, adaptive, and autonomic.

Figure 4D:
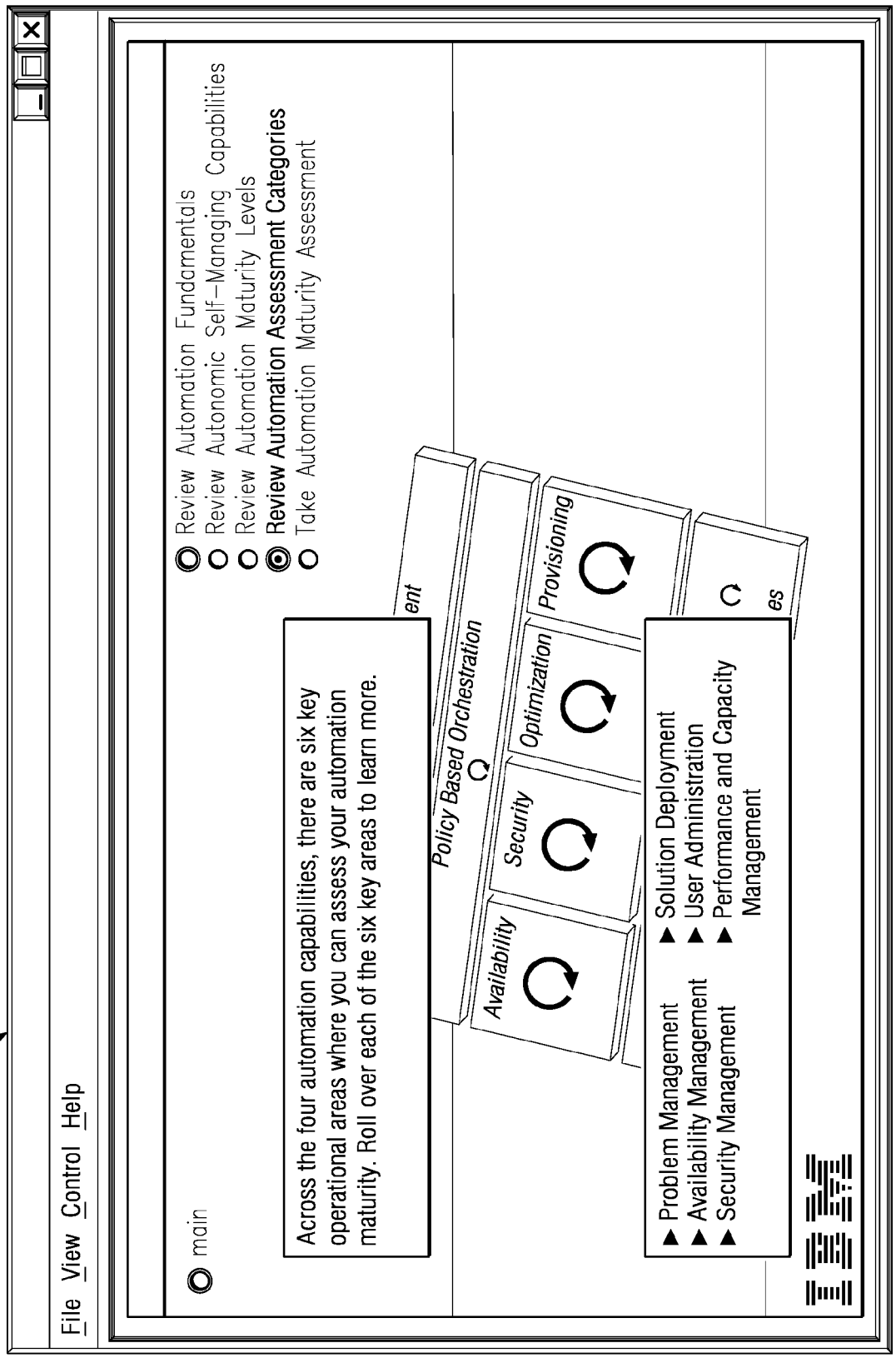

With reference to FIG. 4D, display 430 presents information concerning automation assessment categories. The automation assessment tool of the present invention uses the scale of automation maturity levels to assess on-demand preparedness of the client in each of these assessment categories. A user may navigate display 420 to view a description of each of the assessment categories to prepare for the assessment survey and the subsequent results. In the depicted example, the automation assessment categories include problem management, availability management, security management, solution deployment, user administration, and performance and capacity management.

Figure 5:
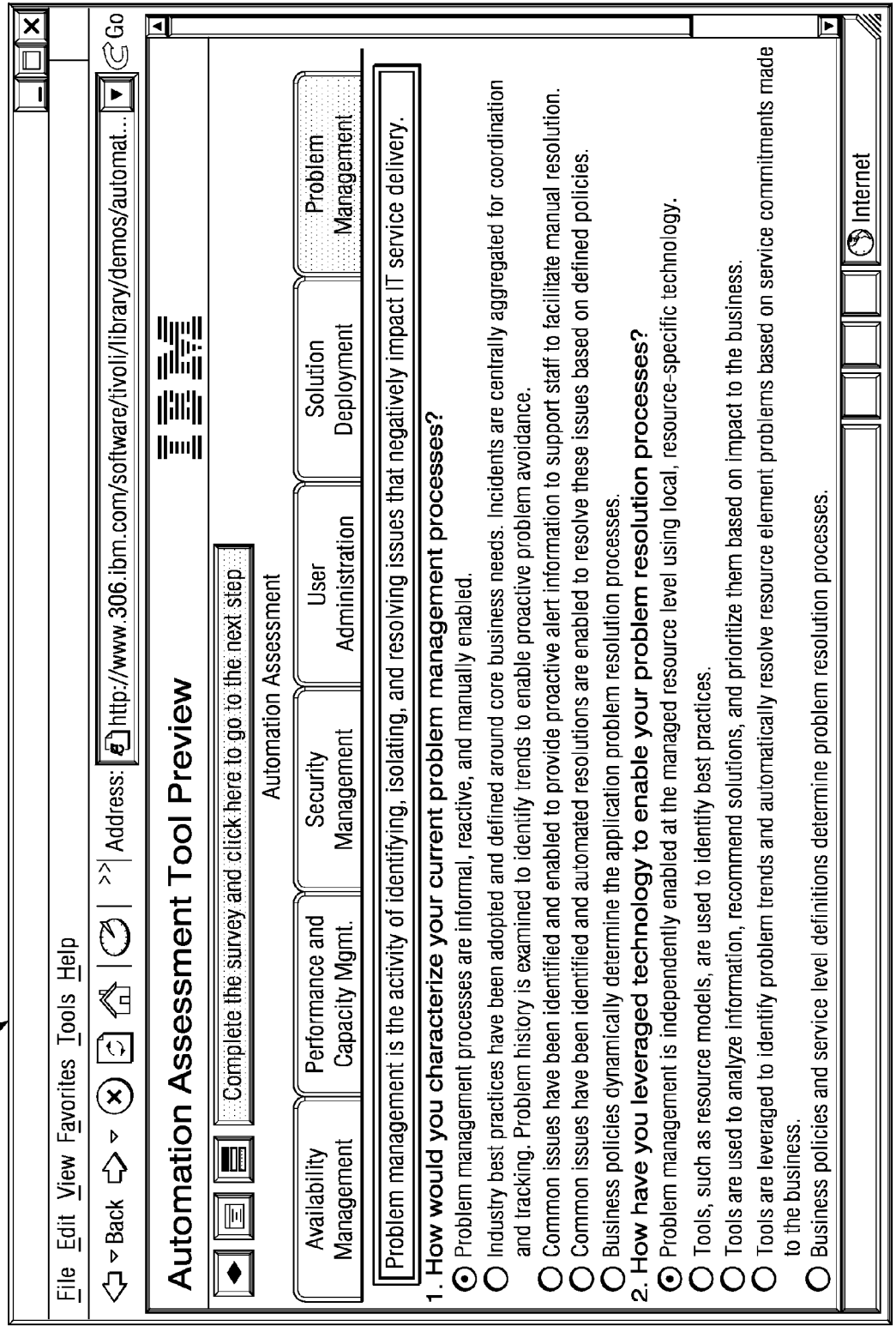
FIG. 5 illustrates an example display presenting an automation assessment survey in accordance with an exemplary embodiment of the present invention.

FIG. 5 illustrates an example display presenting an automation assessment survey in accordance with an exemplary embodiment of the present invention. Display 500 presents survey questions for automation assessment. Sets of questions may be presented for availability management, performance and capacity management, security management, user administration, solution deployment, and problem management, for example. Each question may include a set of multiple-choice answers that are selectable using a set of radio buttons, as depicted in the illustrated example. The user may navigate the assessment categories using tabs or the like.

The automation assessment tool of the present invention may present sets of survey questions for other aspects of automation. For example, a similar display may be used to present survey questions for server and operating system provisioning. Similarly, a separate display may be used to present survey questions for skill sets, automation technology, or security, for instance.

Figure 6A:
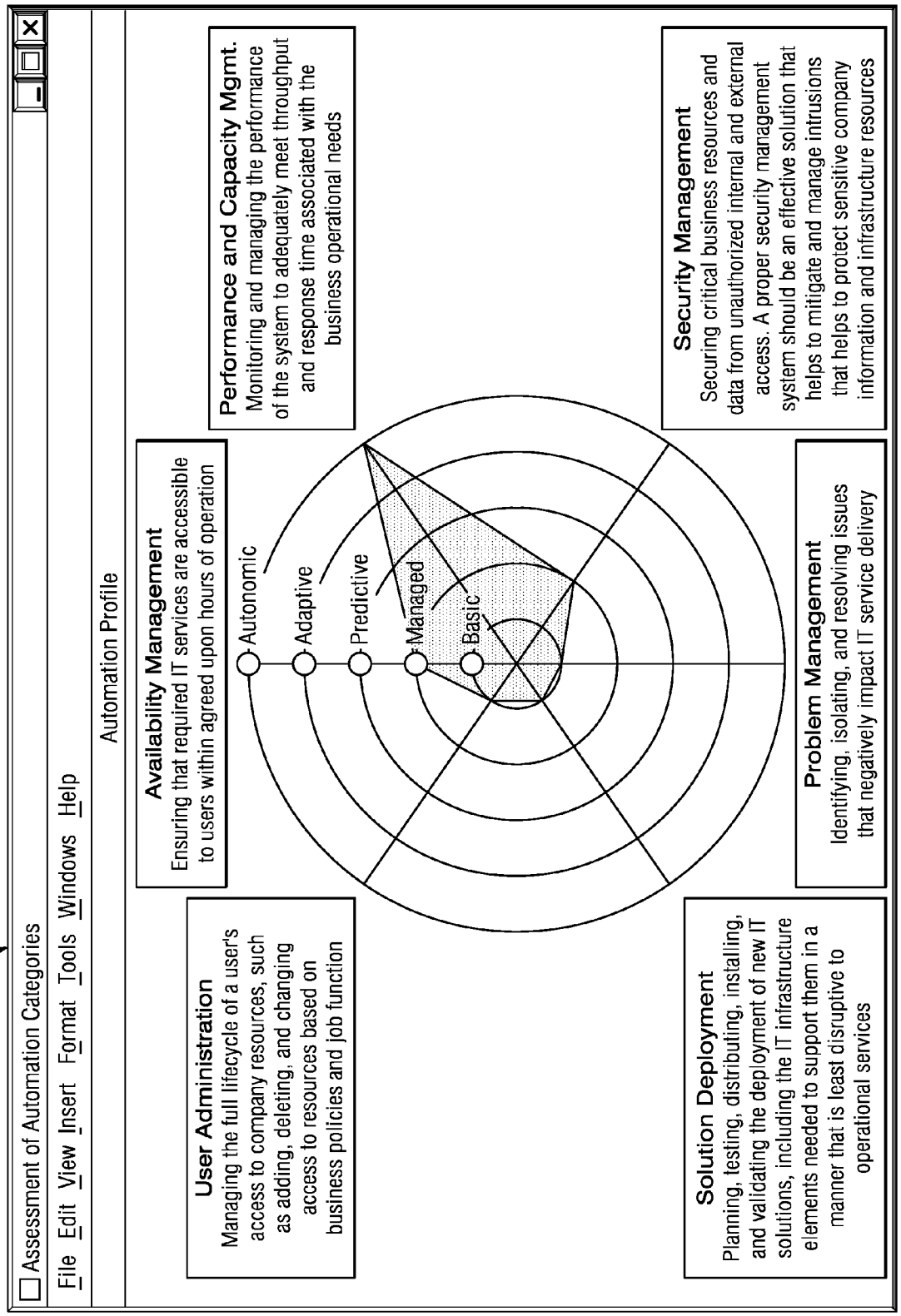
FIGS. 6A-6C are example displays illustrating results of automation assessment in accordance with an exemplary embodiment of the present invention.
Figure 6B:
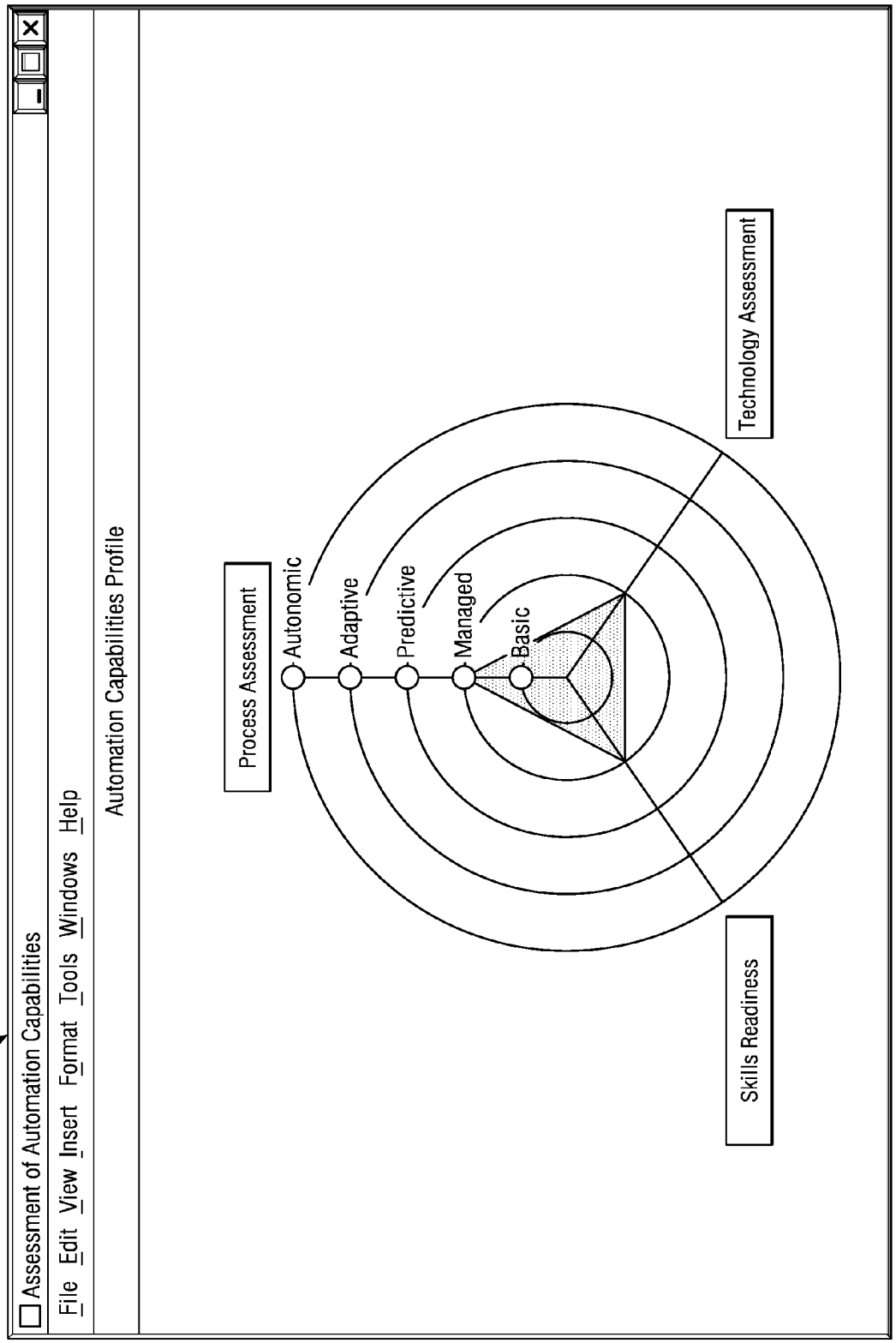
Figure 6C:
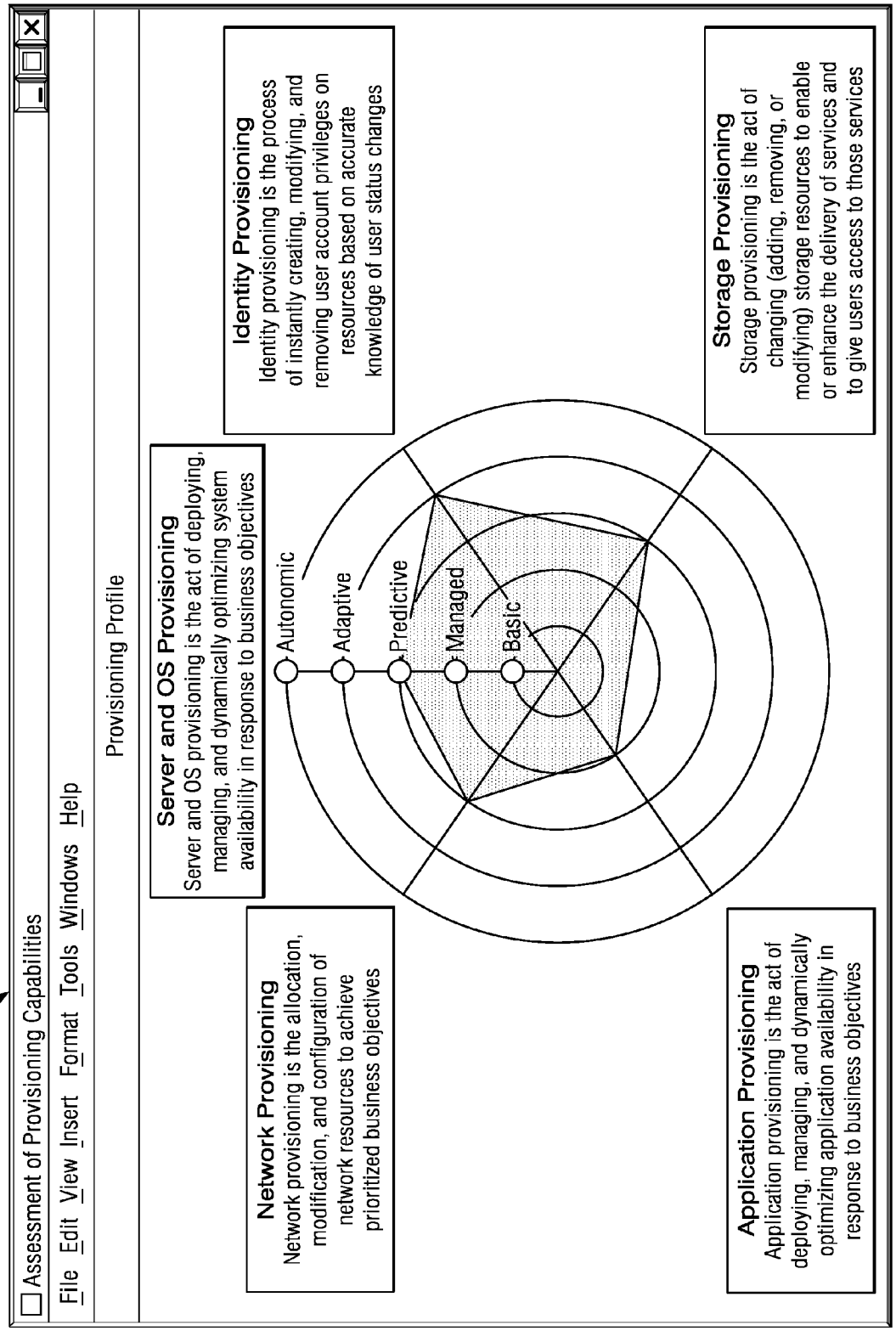

FIGS. 6A-6C are example displays illustrating results of automation assessment in accordance with an exemplary embodiment of the present invention. More particularly, with reference to FIG. 6A, display 600 includes a "spider web" graphical representation of automation assessment. Maturity levels are represented radially and assessment categories are represented as spokes. The maturity level for each assessment category is indicated as a point at the intersection of the radial maturity level and the spoke of the assessment category. These points are connected to form a polygon. Ideally, the polygon should fill as much of the graph as possible.

FIG. 6B illustrates an example display presenting a graphical representation of an automation capabilities profile. Display 610 presents an assessment of automation capabilities. In the depicted example, the automation capabilities include process assessment, technology assessment, and skills readiness.

FIG. 6C illustrates an example display presenting a graphical representation of a provisioning profile. Display 620 presents an assessment of provisioning. In the depicted example, provisioning includes server and operation system provisioning, identity provisioning, storage provisioning, application provisioning, and network provisioning.

Figure 7A:
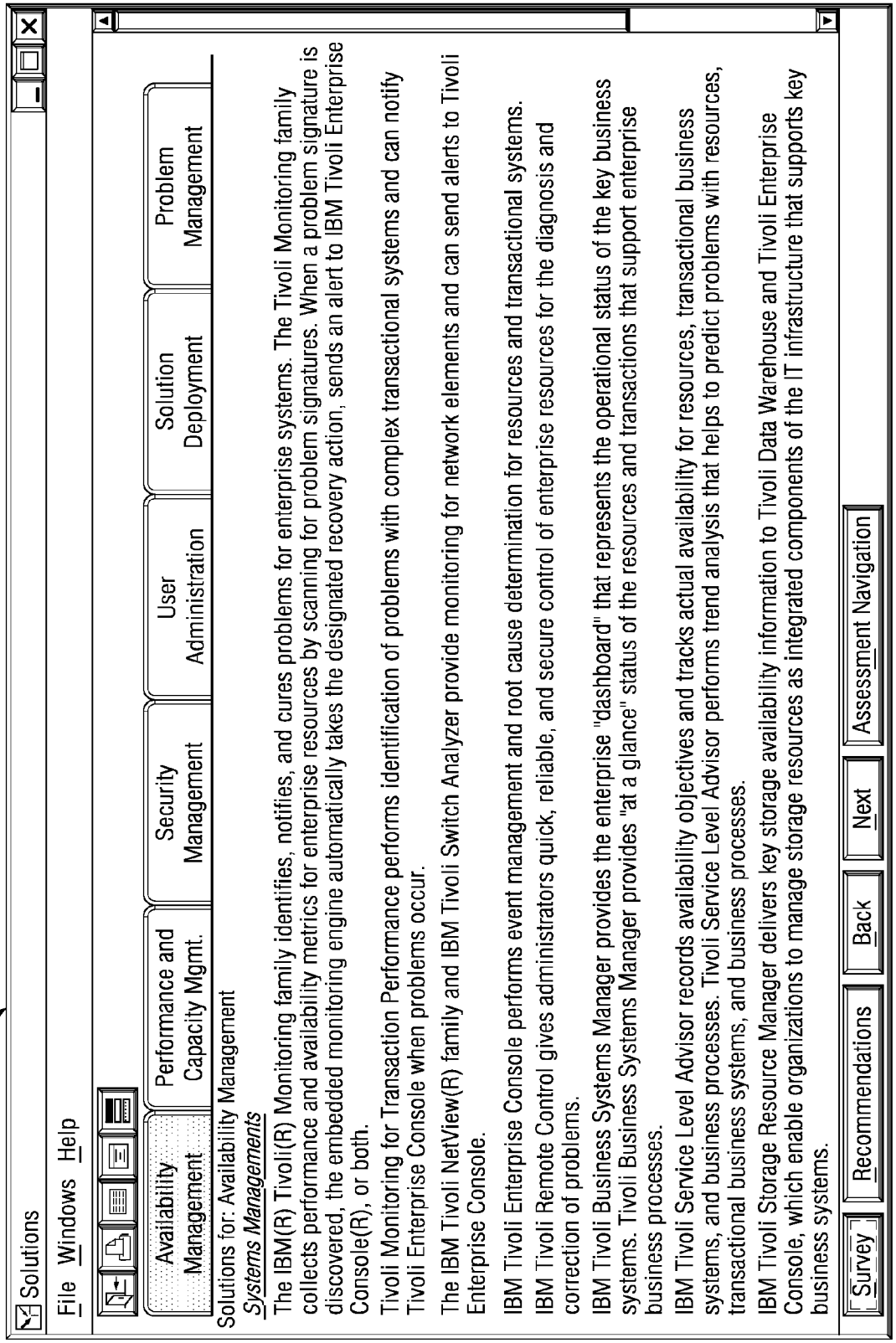
FIGS. 7A and 7B are example displays illustrating solutions and recommendations in accordance with an exemplary embodiment of the present invention.
Figure 7B:
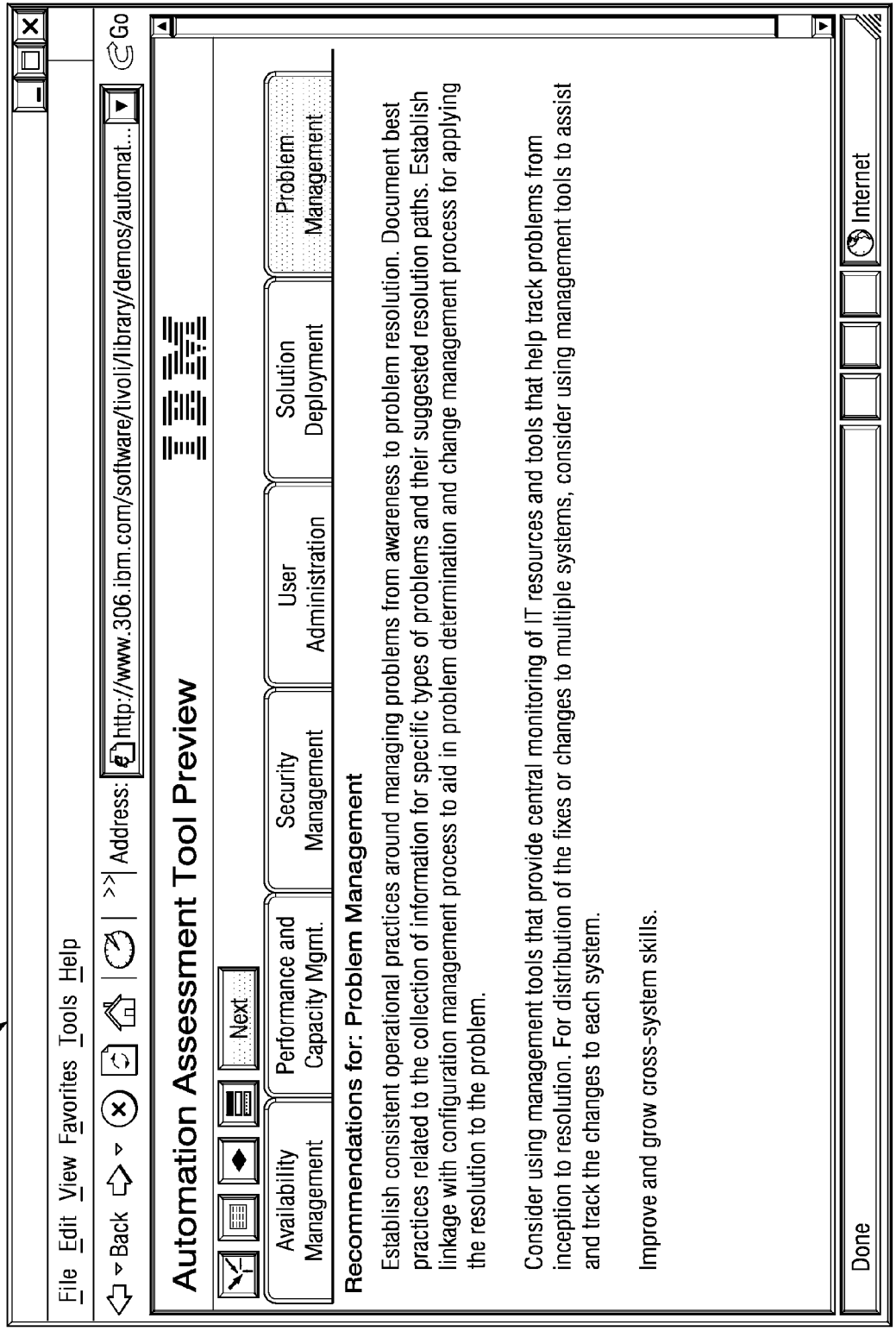

FIGS. 7A and 7B are example displays illustrating solutions and recommendations in accordance with an exemplary embodiment of the present invention. More particularly, with reference to FIG. 7A, display 700 presents exemplary solutions for availability management based on a customer's answers to the assessment survey for availability management. Turning to FIG. 7B, display 710 presents exemplary recommendations for problem management based on the customer's answers to the assessment survey for problem management.

Figure 8:
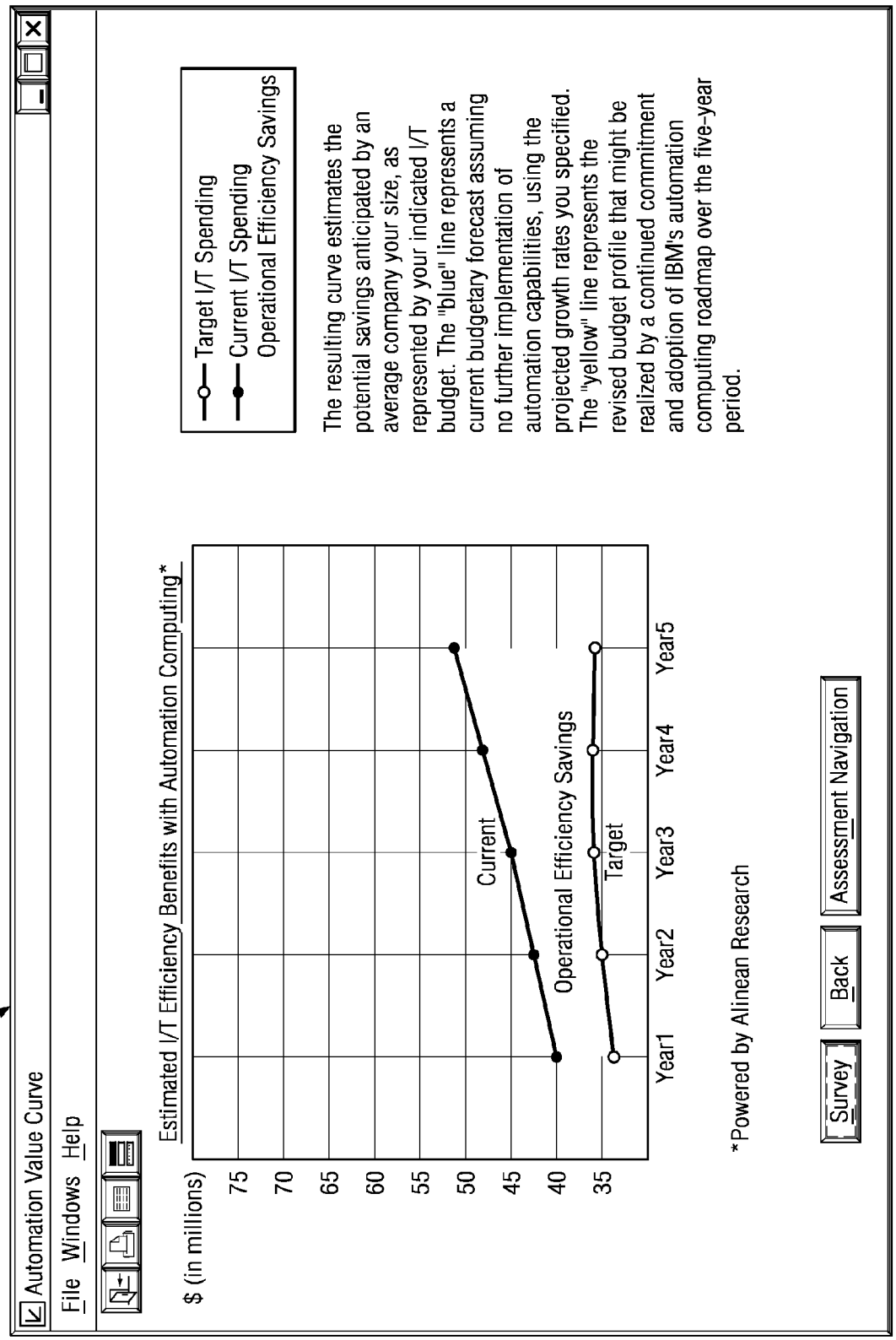
FIG. 8 is an example display illustrating estimated financial benefits with automated computing in accordance with an exemplary embodiment of the present invention.

FIG. 8 is an example display illustrating estimated financial benefits with automated computing in accordance with an exemplary embodiment of the present invention. Display 800 presents a graph including a curve that estimates future IT spending over time based on current automation capabilities and a curve that estimates a future IT spending over time based on a target level of on-demand preparedness. The graph depicted in FIG. 8 serves to illustrate to the customer the financial benefit of being on-demand ready.

FIG. 9 is a flowchart illustrating the operation of an automation assessment tool in accordance with an exemplary embodiment of the present invention. Operation begins and the automation assessment tool presents educational material about autonomic computing (block 902). As discussed above, the educational material may provide information about automation including information about automation fundamentals, autonomic self-managing capabilities, automation maturity levels, and automation assessment categories.

Next, an operator, such as a sales representative or a client, conducts a survey and the automation assessment tool collects survey answers (block 904). The survey may include sets of questions for various aspects of automated computing, including, for example, a number of predetermined assessment categories.

Thereafter, the automation assessment tool ranks aspects of automated computing based on a scale of maturity levels (block 906). The assessment tool then determines solutions and recommendations to achieve a target level of automated computing (block 908) and determines operational efficiency savings for the target level of automated computing (block 910). The tool then presents the solutions, recommendations, and efficiency savings output to the customer (block 912) and operation ends.

Thus, the present invention solves the disadvantages of the prior art by providing an automation assessment tool that defines autonomic technology, processes, organization, and skill sets that apply to autonomic computing. The automation assessment tool provides educational material about autonomic computing and a scale used to measure on-demand preparedness. The automation assessment tool presents a survey and collects answers to the survey questions. The automation assessment tool then determines solutions and recommendations to achieve a target level of on-demand preparedness.

The present invention provides a unique scale of maturity levels for assessing automated computing. The assessment tool of the present invention is capable of applying specific technology to each level of automated computing and automates the business-level process of automated computing sales and marketing consultation. The present invention also overcomes the complexities of automated computing faced by customers and the sales force by providing a tool that guides the operator through educational materials and survey questions and automatically generates solutions and recommendations.

The automation assessment tool of the present invention may also be implemented to navigate through databases of skill sets, organizational information, existing technology, processes, etc., to collect on-demand readiness information, rather than using a question-and-answer survey. The assessment tool may also be applied to corporate education assessment and may extend the virtual engagement process of stand-alone electronic sales.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for assessing self-managing capabilities of an automated computing system, the method comprising:

presenting, by the data processing system, automated computing education material to a customer that educates the customer on how the self-managing capabilities of the automated computing system are assessed by the data processing system;

presenting, by the data processing system, an assessment survey including a plurality of assessment survey questions for each of a plurality of automation computing assessment categories to the customer about a current level of the self-managing capabilities of the automated computing system of the customer, the plurality of automation computing assessment categories in the assessment survey include a problem management category for identifying, isolating, and resolving issues that negatively impact Information Technology services, an availability management category for ensuring availability of Information Technology services, a security management category for securing business resources and data against unauthorized intrusion, a solution deployment category for identifying, planning, testing, distributing, installing, and validating deployment of Information Technology solutions, a user administration category for managing a life cycle of a user's access to available resources, and a performance and capacity management category for managing and monitoring system performance;

receiving, by the data processing system, answers to the plurality of assessment survey questions for each of the plurality of automation computing assessment categories from the customer about the current level of the self-managing capabilities of the automated computing system of the customer to form received assessment survey answers;

assigning, by the data processing system, a computer automation rank according to an automation computing evaluation scale that includes a plurality of predetermined levels of automation computing capabilities used to measure on-demand readiness of automated computing systems to each automation computing assessment category in the plurality of automation computing assessment categories based on the received assessment survey answers about the current level of the self-managing capabilities of the automated computing system of the customer to form an assigned rank for each automation computing assessment category, the plurality of predetermined levels of automation computing capabilities include a basic maturity level that indicates the customer uses manual analysis and problem solving, a managed maturity level that indicates the customer uses centralized tools and performs manual actions, a predictive maturity level that indicates the customer monitors, correlates data, and recommends action, an adaptive maturity level that indicates the customer uses a system that monitors, correlates data, and takes action, and an autonomic maturity level that indicates dynamic business policy based management;

providing, by the data processing system, data for achieving a target level of the self-managing capabilities of the automated computing system to the customer based on the assigned rank for each automation computing assessment category in the plurality of automation computing assessment categories in order for the customer to become more self-managing automation computing capable, wherein providing the data for achieving the target level of the self-managing capabilities of the automated computing system includes determining operational efficiency savings for achieving the target level of the self-managing capabilities of the automated computing system relative to the automation computing capabilities of the customer;

receiving, by the data processing system, changes to the received assessment survey answers about the current level of the self-managing capabilities of the automated computing system of the customer to form changed assessment survey answers for determining how the changes to the received assessment survey answers affect the current level of the self-managing capabilities of the automated computing system of the customer; and determining, by the data processing system, a change in the computer automation rank for each automation computing assessment category in the plurality of automation computing assessment categories based on the changed assessment survey answers.

2. The method of claim 1, wherein the automated computing educational material identifies each computer automation rank in the automation computing evaluation scale that includes the plurality of predetermined levels of automation computing capabilities used to measure a current on-demand readiness of the automated computing systems.

3. The method of claim 1, wherein the automated computing educational material identifies each of the plurality of automation computing assessment categories.

4. The method of claim 1, wherein the plurality of assessment survey questions for each of the plurality of automation computing assessment categories includes multiple-choice answers.

5. The method of claim 1, wherein providing data for achieving the target level of the self-managing capabilities of the automated computing system includes:

determining solutions for automated computing based on the received assessment survey answers about the current level of the self-managing capabilities of the automated computing system of the customer.

6. The method of claim 1, wherein providing data for achieving the target level of the self-managing capabilities of the automated computing system includes:

determining recommendations for achieving the target level of the self-managing capabilities of the automated computing system based on the received assessment survey answers about the current level of the self-managing capabilities of the automated computing system of the customer.

7. The method of claim 1, further comprising:

using an artificial intelligence application to analyze historical information using a set of rules to create an analysis output for achieving the target level of the self-managing capabilities of the automated computing system of the customer.

8. A data processing system for assessing self-managing capabilities of an automated computing system, the data processing system comprising:
a bus system;
a storage device connected to the bus system, wherein the storage device stores a set of instructions; and
a processor device connected to the bus system, wherein the processor device executes the set of instructions to:
present automated computing education material to the customer that educates a customer on how the self-managing capabilities of the automated computing system are assessed by the data processing system;
present an assessment survey including a plurality of assessment survey questions for each of a plurality of automation computing assessment categories to the customer about a current level of the self-managing capabilities of the automated computing system of the customer, the plurality of automation computing assessment categories in the assessment survey include a problem management category for identifying, isolating, and resolving issues that negatively impact Information Technology services, an availability management category for ensuring availability of Information Technology services, a security management category for securing business resources and data against unauthorized intrusion, a solution deployment category for identifying, planning, testing, distributing, installing, and validating deployment of Information Technology solutions, a user administration category for managing a life cycle of a user's access to available resources, and a performance and capacity management category for managing and monitoring system performance;
receive answers to the plurality of assessment survey questions for each of the plurality of automation computing assessment categories from the customer about the current level of the self-managing capabilities of the automated computing system of the customer to form received assessment survey answers;
assign a computer automation rank according to an automation computing evaluation scale that includes a plurality of predetermined levels of automation computing capabilities used to measure on-demand readiness of automated computing systems to each automation computing assessment category in the plurality of automation computing assessment categories based on the received assessment survey answers about the current level of the self-managing capabilities of the automated computing system of the customer to form an assigned rank for each automation computing assessment category, the plurality of predetermined levels of automation computing capabilities include a basic maturity level that indicates the customer uses manual analysis and problem solving, a managed maturity level that indicates the customer uses centralized tools and performs manual actions, a predictive maturity level that indicates the customer monitors, correlates data, and recommends action, an adaptive maturity level that indicates the customer uses a system that monitors, correlates data, and takes action, and an autonomic maturity level that indicates dynamic business policy based management;
provide data for achieving a target level of the self-managing capabilities of the automated computing system to the customer based on the assigned rank for each automation computing assessment category in the plurality of automation computing assessment categories in order for the customer to become more self-managing automation computing capable, wherein providing the data for achieving the target level of the self-managing capabilities of the automated computing system includes determining operational efficiency savings for achieving the target level of the self-managing capabilities of the automated computing system relative to the automation computing capabilities of the customer;
receive changes to the received assessment survey answers about the current level of the self-managing capabilities of the automated computing system of the customer to form changed assessment survey answers for determining how the changes to the received assessment survey answers affect the current level of the self-managing capabilities of the automated computing system of the customer; and
determine a change in the computer automation rank for each automation computing assessment category in the plurality of automation computing assessment categories based on the changed assessment survey answers.

9. A computer readable storage medium encoded with computer executable instructions for assessing automated computing capabilities, the computer readable storage medium comprising:
computer executable instructions for presenting automated computing education material to a customer that educates the customer on how the self-managing capabilities of the automated computing system are assessed by the data processing system;
computer executable instructions for presenting an assessment survey including a plurality of assessment survey questions for each of a plurality of automation computing assessment categories to the customer about a current level of the self-managing capabilities of the automated computing system of the customer, the plurality of automation computing assessment categories in the assessment survey include a problem management category for identifying, isolating, and resolving issues that negatively impact Information Technology services, an availability management category for ensuring availability of Information Technology services, a security management category for securing business resources and data against unauthorized intrusion, a solution deployment category for identifying, planning, testing, distributing, installing, and validating deployment of Information Technology solutions, a user administration category for managing a life cycle of a user's access to available resources, and a performance and capacity management category for managing and monitoring system performance;
computer executable instructions for receiving answers to the plurality of assessment survey questions for each of the plurality of automation computing assessment categories from the customer about the current level of the self-managing capabilities of the automated computing system of the customer to form received assessment survey answers;
computer executable instructions for assigning a computer automation rank according to an automation computing evaluation scale that includes a plurality of predetermined levels of automation computing capabilities used to measure on-demand readiness of automated computing systems to each automation computing assessment category in the plurality of automation computing assessment categories based on the received assessment survey answers about the current level of the self-managing capabilities of the automated computing system of the customer to form an assigned rank for each automation computing assessment category, the plurality of predetermined levels of automation computing capabilities include a basic maturity level that indicates the customer uses manual analysis and problem solving, a managed maturity level that indicates the customer uses centralized tools and performs manual actions, a predictive maturity level that indicates the customer monitors, correlates data, and recommends action, an adaptive maturity level that indicates the customer uses a system that monitors, correlates data, and takes action, and an autonomic maturity level that indicates dynamic business policy based management;

computer executable instructions for providing data for achieving a target level of the self-managing capabilities of the automated computing system to the customer based on the assigned rank for each automation computing assessment category in the plurality of automation computing assessment categories in order for the customer to become more self-managing automation computing capable, wherein providing the data for achieving the target level of the self-managing capabilities of the automated computing system includes determining operational efficiency savings for achieving the target level of the self-managing capabilities of the automated computing system relative to the automation computing capabilities of the customer;

computer executable instructions for receiving changes to the received assessment survey answers about the current level of the self-managing capabilities of the automated computing system of the customer to form changed assessment survey answers for determining how the changes to the received assessment survey answers affect the current level of the self-managing capabilities of the automated computing system of the customer; and computer executable instructions for determining a change in the computer automation rank for each automation computing assessment category in the plurality of automation computing assessment categories based on the changed assessment survey answers.

10. The computer readable medium of claim 9, wherein the automated computing educational material identifies each computer automation rank in the automation computing evaluation scale that includes the plurality of predetermined levels of automation computing capabilities used to measure a current on-demand readiness of the automated computing systems.

11. The computer readable medium of claim 9, wherein the automated computing educational material identifies each of the plurality of automation computing assessment categories.

12. The computer readable medium of claim 9, wherein the plurality of assessment survey questions for each of the plurality of automation computing assessment categories includes multiple-choice answers.

13. The computer readable medium of claim 9, wherein the computer executable instructions for providing data for achieving the target level of the self-managing capabilities of the automated computing system include:

computer executable instructions for determining solutions for automated computing based on the received assessment survey answers about the current level of the self-managing capabilities of the automated computing system of the customer.

14. The computer readable medium of claim 9, wherein the computer executable instructions for providing data for achieving the target level of the self-managing capabilities of the automated computing system include:

computer executable instructions for determining recommendations for achieving the target level of the self-managing capabilities of the automated computing system based on the received assessment survey answers about the current level of the self-managing capabilities of the automated computing system of the customer.

15. The computer readable medium of claim 9, further comprising:

computer executable instructions for using an artificial intelligence application to analyze historical information using a set of rules to create an analysis output for achieving the target level of the self-managing capabilities of the automated computing system of the customer.

* * * * *

UNITED STATES PATENT AND TRADEMARK OFFICE
CERTIFICATE OF CORRECTION

| | | |
|---|---|---|
| PATENT NO. | : 8,019,640 B2 | Page 1 of 1 |
| APPLICATION NO. | : 12/131611 | |
| DATED | : September 13, 2011 | |
| INVENTOR(S) | : Miles A. Barel et al. | |

It is certified that error appears in the above-identified patent and that said Letters Patent is hereby corrected as shown below:

Page 1, Item (75): Inventors: Third inventor, John P. Crosskey, should be removed and replaced by his correct legal name James P. Crosskey.

Signed and Sealed this
Twenty-seventh Day of March, 2012

David J. Kappos
*Director of the United States Patent and Trademark Office*